United States Patent [19]

Butler, III et al.

[11] Patent Number: 4,845,836

[45] Date of Patent: Jul. 11, 1989

[54] METHOD FOR FEEDING A THROUGH-BOLT THROUGH A BORE IN A STATOR CORE

[75] Inventors: John M. Butler, III, Orlando, Fla.; Kurt K. Lichtenfels, Murrysville, Pa.

[73] Assignee: Westinghouse Electric Corp., Pittsburgh, Pa.

[21] Appl. No.: 182,654

[22] Filed: Apr. 18, 1988

[51] Int. Cl.$^4$ ............................................. H02K 15/14
[52] U.S. Cl. ...................................... 29/596; 29/433; 29/402.08; 29/732; 72/166
[58] Field of Search ................. 29/596, 598, 732, 736, 29/241, 433, 402.08, 402.14, 402.15; 72/166; 310/42

[56] References Cited

U.S. PATENT DOCUMENTS 4,578,852 4/1986 Sauerwein et al. .................... 29/596

Primary Examiner—Carl E. Hall

[57] ABSTRACT

An apparatus and method for feeding a throughbolt through a bore in a dynamoelectric machine while initially feeding the same towards the end of the bore along a line forming an acute angle with the axis of the bore. The apparatus has a pair of opposed rotatable wheels and a support plate therefore, at least one guide roller spaced from one end of the support plate, and at least one guide roller spaced from the other end of the support plate. A carriage aligns the wheels and the rollers in two spaced parallel planes through which a through-bolt will pass and a reciprocable member on the carriage effects relative movement between the pair of spaced rotatable wheels and the first and second guide rollers, in a direction transverse the parallel planes such that the through-bolt is deflected from the acute angle at which it is being fed and coaxially aligned with the axis of the bore and adapted to be fed therethrough.

2 Claims, 3 Drawing Sheets

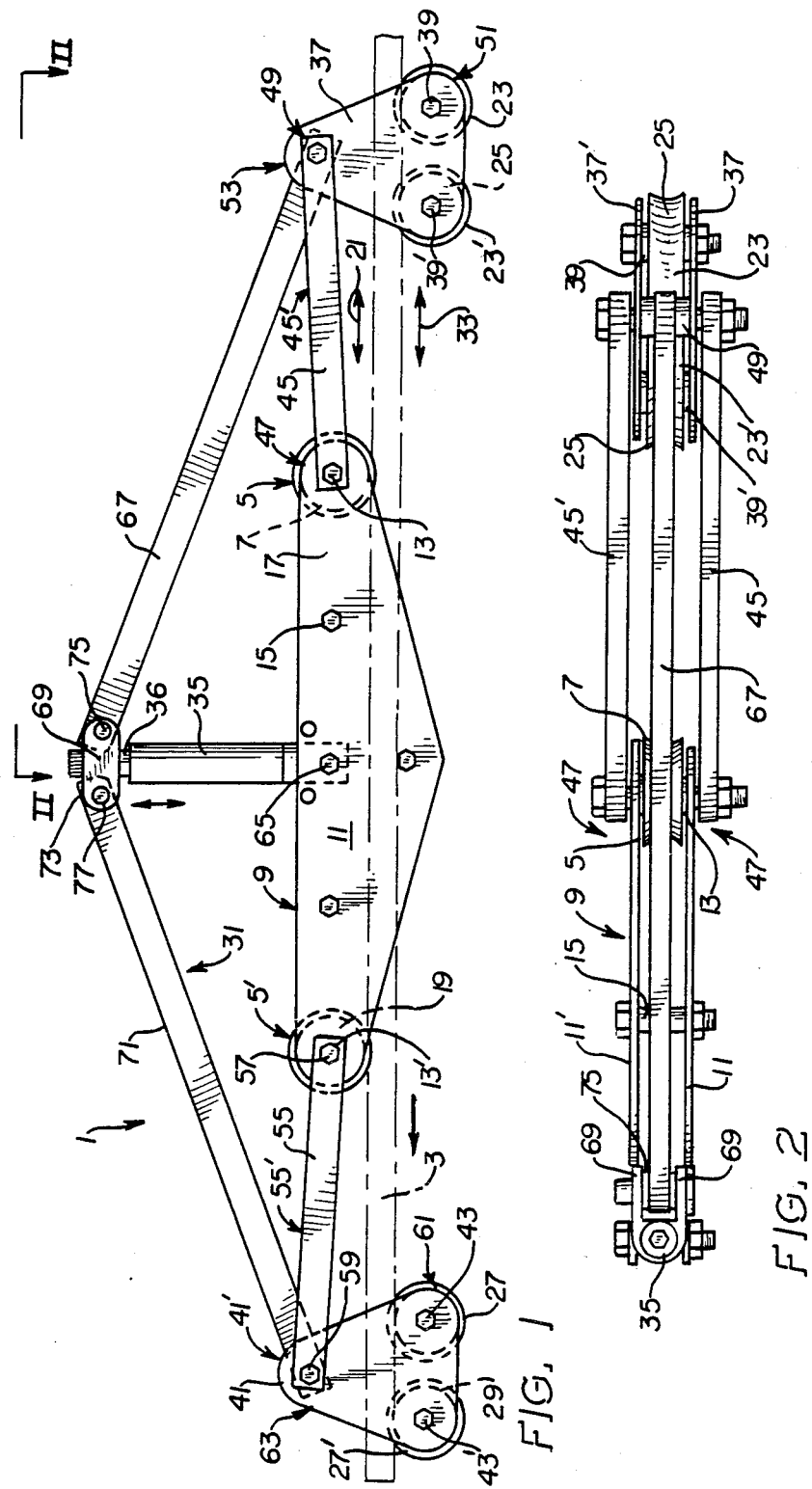

METHOD FOR FEEDING A THROUGH-BOLT THROUGH A BORE IN A STATOR CORE

BACKGROUND OF THE INVENTION

The invention relates to an apparatus and a method for feeding a through-bolt through coaxially aligned openings through a stator core of a dynamoelectric machine, which openings form a bore through the stator core, while initially feeding the through-bolt towards a first end of the bore along a line forming an acute angle with the axis of the bore.

Large dynamoelectric machines such as generators typically have stator cores, which usually comprise many axially thin annular laminations that are assembled together and compressed to form a cylindrical stator core supported in a frame. Stator coils are received in radial slots in the radially inner periphery of the stator core which extend beyond both axial ends of the stator core and are interconnected to form a stator winding. The stator core laminations have coaxially aligned openings therethrough which form bores through the stator core, and through-bolts extend axially through the bores, with nuts provided on both axial ends of the through-bolts which are torqued or hydraulically tensioned to hold core support system in assembled position and maintain the axial continuity and integrity of the stator core. The throughbolts are insulated, with the nuts maintaining the laminations in axial compression. Such a dynamoelectric machine is described in U.S. Pat. No. 4,227,109, assigned to the assignee of the present invention, and the contents of which are incorporated by reference herein, and which is directed to a system for providing uniform expansion of a stator.

The through-bolts, without the nuts, are generally free to slide axially relative to the frame of the dynamoelectric machine and through the bores in the stator core. These machines, and the through-bolts are large assemblies, with a typical through-bolt being about 3.175 cm (1.25 inches) in diameter wrapped with dielectric insulation to give a total diameter of about 4.29 cm (1.69 inches) and being about 7.62 meters (300 inches) in length, with such bolts weighing on the order of about 45 Kg (100 pounds). At times, the removal of a through-bolt from a stator core is required, such as in retrofitting of the dynamoelectric machine. Often, however, the dynamoelectric machine, because of size, is disposed in a space below the normal floor line of a building, such that the machine is often partially below the floor line. Thus, difficulties often arise due to the lack of clearance available between the end of the stator core and the wall of the foundation or floor level of the building. Such an absence of sufficient clearance prevents the axial alignment for insertion of a through-bolt into the bore of the stator core.

There are currently two known methods in use for the retrofitting of such through-bolts. One method requires that the entire generator and rotor be lifted out of the space below the floor level to allow new bolts to be inserted. This method is very expensive and time consuming. also, when one lifts the generator, one runs the risk of causing misalignment which could cause increased rotor vibration. A second method of installation of a throughbolt requires the use of segmented through-bolts. A segment is partially inserted and then welded to a following segment. The assembly is fed further into the bore and a further segment attached thereto, and the sequence repeated until the attached segments form one long bolt running the length of the generator. Because of the welds, however, such segmented through-bolts are weaker than their one piece counterparts, and are simply too weak for some applications. This procedure also involves the use of a substantial amount of time and expense.

It is an object of the present invention to provide a system that will enable the insertion of a through-bolt through the stator core of a dynamoelectric machine, which is disposed in a recessed space having insufficient clearance for axial aligning of the throughbolt with a bore in the stator core.

SUMMARY OF THE INVENTION

With this object in view, the present invention resides in an apparatus and method for feeding a throughbolt through coaxially aligned openings through a stator core of a dynamoelectric machine, which openings form a bore through the stator core having first and second ends, while initially feeding the through-bolt towards the first bore end along a line forming an acute angle with the axis of the bore.

The apparatus has a pair of spaced rotatable wheels, each having a groove in the periphery thereof, and a support plate, having first and second ends, positioning the pair of wheels such that the groove thereof are aligned in a common plane. At least one first guide roller is provided, having a groove in the outer periphery thereof, spaced from the first end of the support plate, and at least one second guide roller is provided, having a groove in the outer periphery thereof, spaced from the second end of the support plate. A carriage is provided for aligning and positioning the first and second guide rollers in a plane parallel to and spaced from the plane of the pair of spaced rotatable wheels a distance sufficient to pass a through-bolt between the grooves of the spaced rotatable wheels and the first and second guide rollers, while a reciprocable member on the carriage is provided for effecting relative movement between the pair of spaced rotatable wheels and the first and second guide rollers, in a direction transverse the parallel planes thereof, whereby the through-bolt is deflected from the acute angle at which it is being fed, while being passed between the pair of spaced rotatable wheels and the first and second guide rollers, towards the first bore end and is positioned coaxially with the axis of the bore and adapted to be fed therethrough. Preferably, the first and second guide rollers each comprise a pair of adjacent guide rollers.

In one embodiment, the carriage has a first pair of spaced end plates and shafts extending therebetween on which the first guide roller is disposed, a second pair of spaced end plates and shafts extending therebetween on which the second guide roller is disposed, a first link bar extending between the first end of the support plate and the first pair of spaced end plates, a second link bar extending between the second end of the support plate and the second pair of spaced end plates, a first beam extending between the first pair of spaced end plates and the reciprocable member, a second beam extending between the second pair of spaced end plates and the reciprocable member, with the reciprocable member extending between the beams and the support plate, a pivotable connection between each pair of end plates and a respective link bar, a pivotal connection between each pair of end plates and a respective beam, and a pivotal connection between each beam and the reciprocable member.

In another embodiment, the carriage has a first pair of spaced end plates and shafts extending therebetween on which the first guide roller is disposed, a second pair of spaced end plates and shafts extending therebetween on which the second guide roller is disposed, a U-shaped tie beam having a central section extending between the first and second pairs of end plates and a leg section extending between the central section and a respective pair of end plates, the leg pivotally secured to the respective pair of end plates, with the reciprocable member being secured at one end to the central section of the U-shaped tie beam and at the other end thereof to the support plate.

DESCRIPTION OF THE DRAWINGS

The invention will become more readily apparent from the following description of preferred embodiments thereof shown, by way of example only, in the accompanying drawings, wherein:

FIG. 1 is a side elevational view of a preferred embodiment of an apparatus of the present invention showing a through-bolt in straight line position therethrough;

FIG. 2 is a view taken along lines II—II of FIG. 1 with the through-bolt removed for clarity;

DETAILED DESCRIPTION

Figure 3:
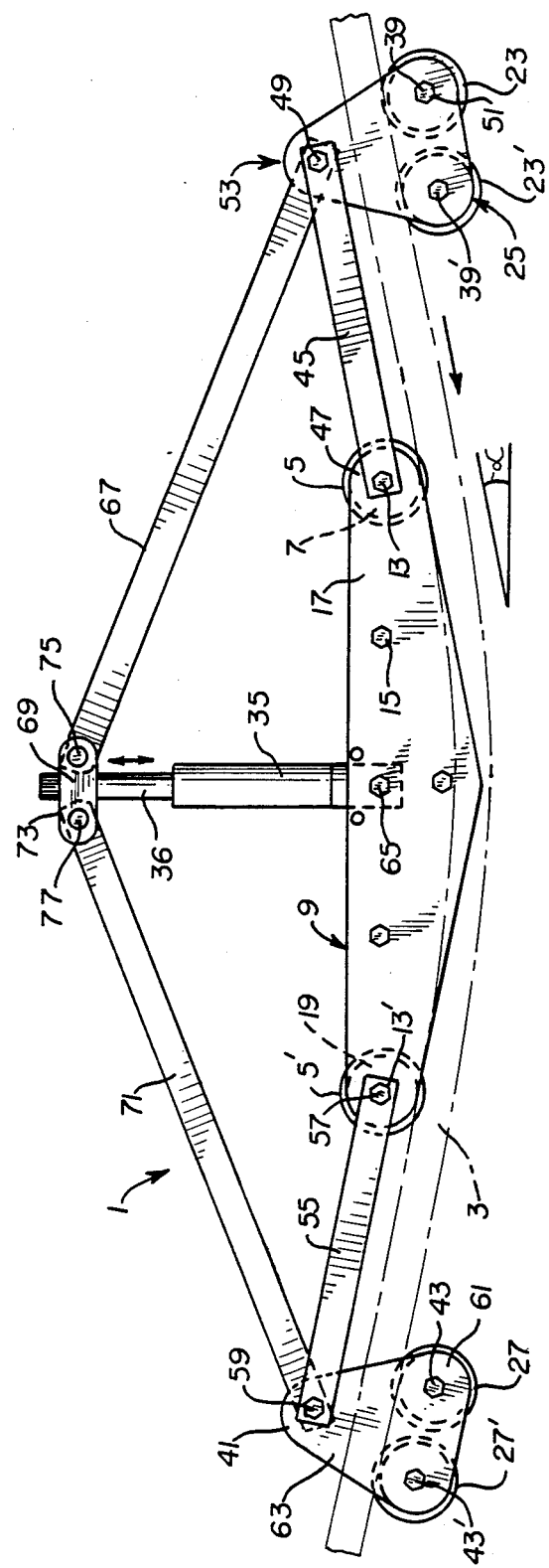
FIG. 3 is a side elevational view of the embodiment of FIG. 1 where the through-bolt is deflected therein.

The present apparatus and method are usable to insert a through-bolt through the stator core of a dynamoelectric machine, such as a generator, when the through-bolt cannot be axially aligned with the bore through the stator core due to space limitations. As described previously, such bolts can be on the order of 7.62 meters (300 inches) in length. Such bolts are generally formed from a steel alloy, such as a nickel based steel, for example a Nitronic steel alloy such as Nitronic 32. The bolt, as described previously is wrapped with a dielectric insulation, such as a tape insulation sold under the tradename Nomex. Such insulation must be protected during any maneuvering of the bolt during installation into the stator core.

Referring now to the drawings, an apparatus 1 is provided for feeding a through-bolt 3 through a bore in a stator core of a dynamoelectric machine. The apparatus 1, includes a pair of spaced rotatable wheels 5, 5' each having a groove 7 in the periphery thereof, which are supported for free-wheeling movement by a support plate 9. The support plate 9 is preferably a pair of side plates 11, 11' that have shafts 13, 13' extending therebetween upon which the spaced rotatable wheels 5, 5' are mounted, with additional spacing members 15 positioned therebetween to support the wheels 5, 5'. The support plate has a first end 17 and a second end 19 and positions the spaced rotatable wheels 5, 5' such that the grooves thereof are aligned in a first common plane, indicated as 21 in the drawings.

In a preferred embodiment, a first pair of adjacent guide rollers 23, 23', which have grooves 25 in the outer periphery thereof are provided spaced from the first end 17 of the support plate 9, while a second pair of adjacent guide rollers 27, 27', which have grooves 29 in the outer periphery thereof are provided spaced from the second end 19 of the support plate 9. A carriage 31 aligns and positions the first pair of adjacent guide rollers 23, 23' and the second pair of adjacent guide rollers 27, 27' in a second plane, indicated as 33 in the drawings, parallel to and spaced from the plane 21 of the pair of spaced rotatable wheels 5, 5', a distance sufficient to pass a through-bolt 3 between the grooves 7 of the spaced rotatable wheels 5, 5' and the first and second pairs of adjacent guide rollers 23, 23', 27, 27'. A reciprocable member 35, such as a hydraulic cylinder with exposed plunger 36 is provided on the carriage 31 to effect relative movement between the pair of spaced rotatable wheels 5, 5' and the first and second pairs 23, 23', 27, 27' of adjacent guide rollers, in a direction transverse the parallel planes 21, 33.

In the embodiment illustrated in FIGS. 1 to 3, the carriage 31 contains a first pair of spaced end plates 37, 37' with shafts 39, 39' which extend there between and upon which the first pair of adjacent guide rollers 23, 23' are disposed, and a second pair of spaced end plates 41, 41' with shafts 43, 43' which extend therebetween and upon which the second pair of adjacent guide rollers 27, 27' are disposed. A first pair of link bars 45, 45' extend between the first end 17 of the support plate 9 and the first pair of spaced end plates 37, 37'. The link bars 45, 45' are pivotally connected to the support plate 9, preferably by pivotal attachment to the ends of the shaft 13, as indicated at 47, and are also pivotally connected to the pair of spaced end plates 37, 37', preferably by pivotal attachment to the ends of a pivot pin 49 extending between the spaced end plates 37, 37'. The end plates 37, 37' are, as illustrated, preferably triangular in shape, with the rollers 23, 23' adjacent the base 51 of the triangle and the pivot pin 49 adjacent the apex 53 of the triangle. Similarly, a second pair of link bars 55, 55' extend between the second end 19 of the support plate 9 and the second pair of spaced end plates 41, 41'. The link bars 55, 55' are pivotally connected to the support plate 9, preferably by pivotal attachment to the ends of the shaft 13', as indicated at 57, and are also pivotally connected to the pair of spaced end plates 41, 41' preferably by pivotal attachment to a pivot pin 59 extending between the spaced end plates 41, 41'. The end plates 41, 41', are also preferably triangular in shape, with the rollers 27, 27' adjacent the base 61 of the triangle and the pivot pin 59 adjacent the apex 63 thereof.

The reciprocating member 35 is attached to the support plate 9 by a fastener 65 and extends away from the support plate 9 in a direction normal to the plane 21 of the grooves 7 in wheels 5 and 5'. A first beam 67 extends between a clevis 69, on the plunger 36 of the reciprocating member distant from the support plate 9, and the first pair of end plates 37, 37', while a second beam 71 extends between a clevis 73, on the plunger 36, and the second pair of end plates 41, 41'. The two beams 67 and 71 are pivotally secured to the clevises 69 and 73 by pivot pins 75 and 77 respectively, while the other ends thereof are pivotally secured to the respective end plates 37, 37' and 41, 41' by pivot pins 49 and 59 respectively.

Figure 4:
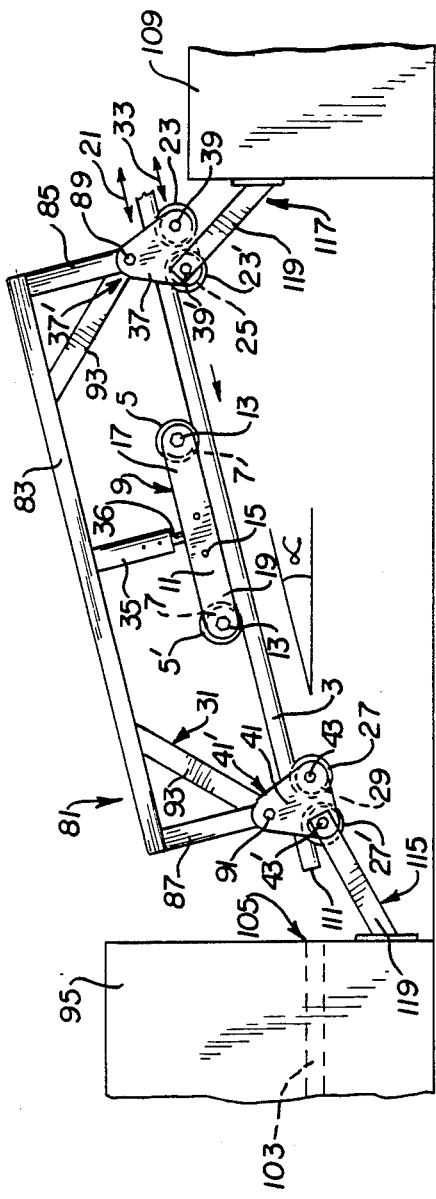
FIG. 4 is a schematic illustration of another preferred embodiment of the apparatus of the present invention in position to feed a through-bolt to the bore end of a generator.
Figure 5:
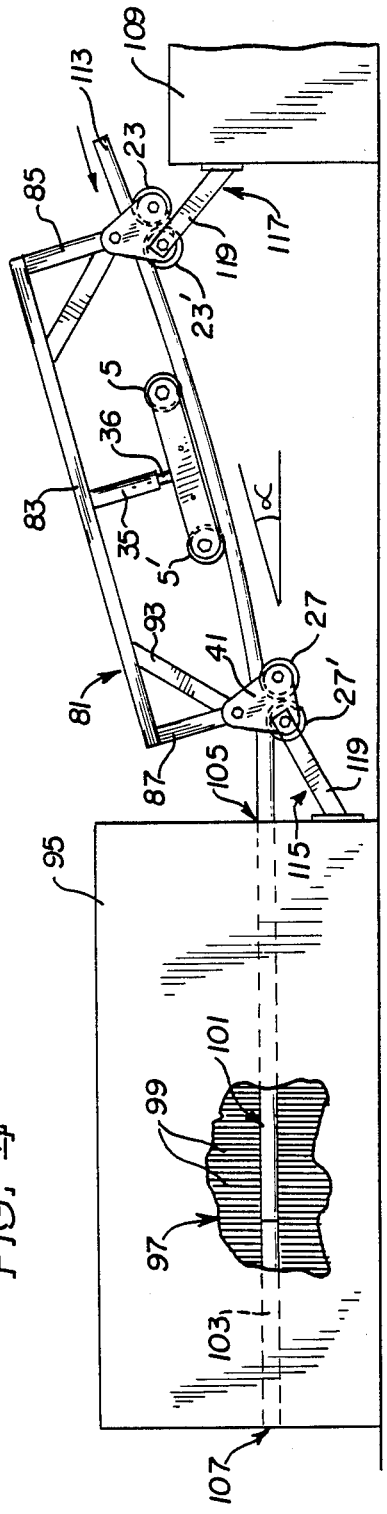
FIG. 5 is a schematic illustration of the embodiment shown in FIG. 4 feeding a through-bolt fed initially at an angle to the bore through a stator core, into the stator core bore in a coaxial direction therewith.

In the embodiment of the apparatus 1, designated as 81, illustrated in FIGS. 4 and 5, the carriage 31 contains a first pair of end plates 37, 37′ with shafts 39, 39′ which extend therebetween and upon which the first pair of guide rollers 23, 23′ are disposed, and a second pair of spaced end plates 41, 41′ with shafts 43, 43′ which extend therebetween and upon which the second pair of adjacent rollers 27, 27′ are disposed. A U-shaped tie beam has a central section 83 which extends between the first and second pairs of end plates 37, 37′ and 41, 41′, and two leg sections 85 and 87. Leg section 85 extends between the central section 83 and the first pair of spaced end plates 37, 37′ and is pivotally connected thereto through pivot pin 89, while the leg section 87 extends between the central section 83 and the second pair of spaced end plates 41, 41′ and is pivotally connected thereto through pivot pin 91. Cross braces 93 may be provided for strengthening the leg section and central section. The reciprocable member 35 is attached to the central section 83 of the carriage 31, and extends in a direction normal to the planes.

While both embodiments of the apparatus 1 and 81 provide a reciprocable member on a carriage for effecting relative movement between the first pair of rotatable wheels and the first and second pairs of adjacent guide rollers, alternative movement is effected in the two embodiments. In the first embodiment of the apparatus 1, the plunger 36 moves the first and second pairs of adjacent guide rollers 23, 23′ and 27, 27′ towards the pair of rotatable wheels 5, 5′, while in the second embodiment of the apparatus 81, the plunger 36 moves the pair of rotatable wheels 5, 5′ towards the first and second pairs of adjacent guide rollers 23, 23′ and 27, 27′. In both embodiments, the through-bolt 3 is deflected from the acute angle at which it is initially fed, while being passed between the pair of spaced rotatable wheels and the first and second pairs of adjacent guide rollers, towards the end of the bore through the stator core and positioned coaxially therewith and adapted to be fed through the bore. Also, while the embodiments illustrated show a pair of adjacent guide rollers on each side of the rotatable wheels 5, 5′, one such guide roller could be substituted for each said pair, within the scope of the present invention.

The practice of the present invention is illustrated with reference to FIGS. 4 and 5. As illustrated, a dynamoelectric machine 95 has a stator core 97 therein. The stator core is comprised of laminations 99 that have openings 101 therethrough, the openings 101 forming a bore 103 having a first end 105 and second end 107. As illustrated, the dynamoelectric machine 95 is often set into a space below the floor level or foundation 109 which prohibits straight axial placement of a through-bolt 3 into the first end 105 of the bore 103. The through-bolt is, according to the present invention, fed towards the first end 105 of the bore 103 along an acute angle $\alpha$ with the axis of the bore 103, with the leading end 111 approaching the bore 103, and the trailing end 113 distant therefrom.

While the insulation on the through-bolt is under compression at the wheels 5, 5′ of the support plate, the rollers 23, 23′ spaced from one end 17 of the support plate 9, and the rollers 27, 27′ spaced from the other end 19 of the support plate 9, distribute the load on the outer surface of the through-bolt therebetween.

The through-bolt 3 may be manually fed through the apparatus 1, and the apparatus 1 may be held manually or supported by an attachment means 115 releasably secured to the dynamoelectric machine 95 and/or on attachment means 117 releasably secured to an adjacent foundation 109 or other support surface, which attachment means comprise support legs 119.

While the present apparatus is described for use in feeding a through-bolt to a bore in the stator core, it should be noted that the same can also be used to remove a through-bolt from a stator core where spacing is limited by reversing the steps above and feeding the coaxially fed through-bolt through the apparatus 1, so as to deflect the same into an acute angle with the bore and remove the same at such an acute angle.

We claim:

1. A method of inserting a through-bolt through coaxially aligned openings through a stator core of a dynamoelectric machine, which openings form a bore through the stator core having first and second ends comprising:

feeding a through-bolt having a leading and a trailing end towards the first end of said bore along a line forming an acute angle with the axis of said bore;

as said feeding occurs subjecting said through-bolt to a bending force, intermediate said leading end and said trailing end and at a portion of said through-bolt yet to said enter bore, to position said leading end into coaxial relationship with said first end of said bore; and continuing feeding of said through-bolt with said leading end passing through said bore until the leading end thereof passes through said second end of said bore.

2. The method as defined in claim 1 wherein said through-bolt is formed from a nickel based steel alloy and has a dielectric coating thereon.

* * * * *